SPREADER APPARATUS

Filed Jan. 21, 1966

Inventors
Burl A. Wilder
Eskil W. Swenson
Clas O. F. Fyrk
By
McKenna, Marsbach & Pillote
Attorneys Oct. 3, 1967 B. A. WILDER ETAL 3,344,993

SPREADER APPARATUS

Filed Jan. 21, 1966 4 Sheets-Sheet 2

Inventors
Burl A. Wilder
Eskil W. Swanson
Clas O. F. Fyrk
By
McCanna, Morsbach & Pillote
Attorneys Oct. 3, 1967 B. A. WILDER ETAL 3,344,993

SPREADER APPARATUS

Filed Jan. 21, 1966 4 Sheets-Sheet 3

Inventors
Burl A. Wilder
Eskil W. Swenson
Clas O. F. Fyrk

By
McCanna, Morsbach & Pillote
Attorneys

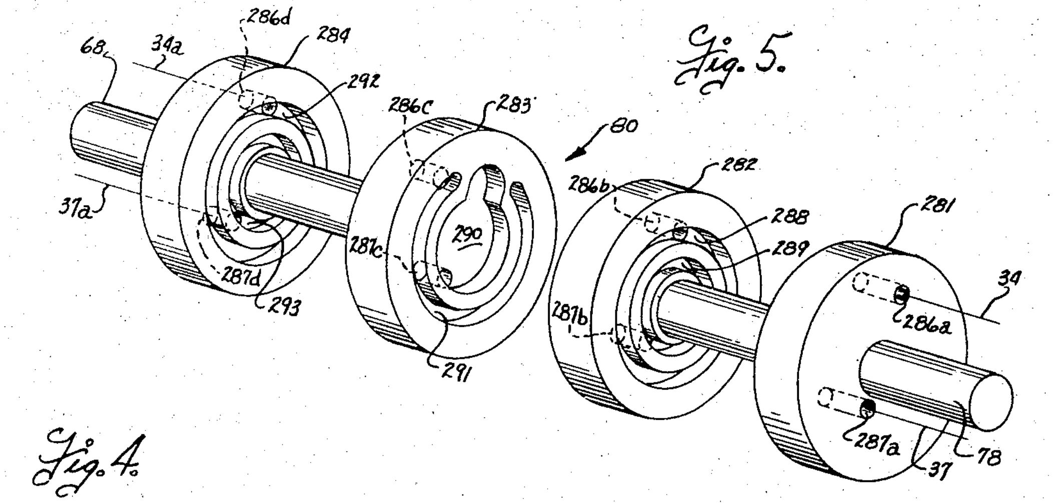
Fig. 5.
Fig. 4.
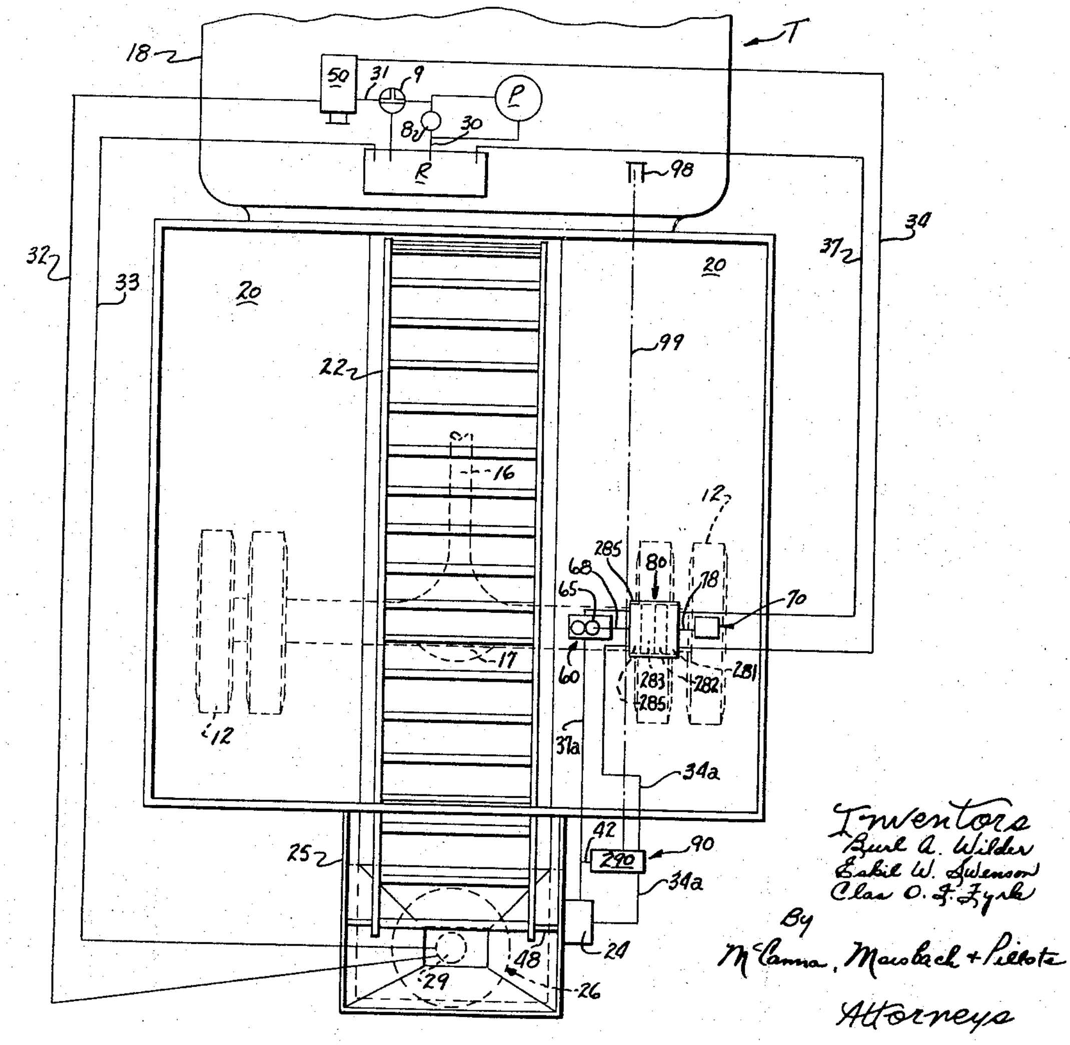
Inventors
Burl A. Wilder
Eskil W. Swenson
Claes O. L. Lyrk
By
McCanna, Morsbach + Pillote
Attorneys United States Patent Office 3,344,993

Patented Oct. 3, 1967

3,344,993

SPREADER APPARATUS

Burl A. Wilder, Lindenwood, Eskil W. Swenson, Cherry Valley, and Clas O. F. Fyrk, Boone County, Ill., assignors to Swenson Spreader & Mfg. Co., Lindenwood, Ill., a corporation of Illinois Filed Jan. 21, 1966, Ser. No. 522,078
23 Claims. (Cl. 239—164)

ABSTRACT OF THE DISCLOSURE

A spreader, a hopper, and a discharge means for feeding material from the hopper to the spreader. Controls are provided for maintaining a preselected ratio between the speed of the vehicle and the speed of the discharge means. Specific mechanical, electrical, and hydraulic controls are described. Means is also provided for selectively altering the preselected ratio.

This is a continuation-in-part of application Ser. No. 448,108, filed Apr. 14, 1965.

This invention relates in general to improvements in vehicles having spreader apparatus for spreading materials and particularly to a spreader apparatus having an improved means for controlling discharge of material.

In the spreading of materials such as salt, sand, lime, chemicals, bituminous materials, and the like, it is frequently desirable to vary the amount of material applied to the selected area to accommodate different materials being spread and the different conditions of the area being covered. After a quantity of material to be spread has been selected, it is desirable to spread the material in a uniform and economical manner over large areas at the preselected rate and, at the same time, be able to vary the quantity of material spread as conditions warrant.

An object of this invention is to provide a spreader apparatus for discharging material on a surface in such a manner that great savings in material are realized.

Another object of this invention is to provide a spreader apparatus for use on a vehicle and for discharging material at a rate proportional to the speed of the vehicle.

Still another object is to provide a spreader apparatus for discharging material from a vehicle at a rate proportional to the speed of the vehicle and which utilizes hydraulic power.

Another object of this invention is to a provide a spreader apparatus for discharging material from a vehicle at a rate correlative to the speed of the vehicle and which rate will be substantially maintained without human aid.

Yet another object of this invention is to provide a spreader apparatus in accordance with the foregoing objects and, additionally, which enables selective altering of the amount of material discharged relative to the speed of the vehicle.

A further object of this invention is to provide a spreader apparatus for use on a vehicle in accordance with the above objects, in which controls for the apparatus can be located for manipulation from the operator's compartment of the vehicle to enable convenient selective altering of the amount of material discharged.

A still further object is to provide a spreader apparatus in accordance with the foregoing object in which the manipulation of the controls may be conveniently performed while the vehicle is in motion.

Another object is to provide a spreader apparatus for use on a vehicle and for discharging a plurality of materials simultaneously.

These, together with various ancillary objects and advantages of this invention will be more readily appreciated as the same is better understood by reference to the following detailed description and the accompanying drawings wherein:

FIG. 1A is a sectional view taken generally along plane 1–A—1–A of FIG. 1 and on a larger scale;

FIG. 4 is a view similar to FIG. 3 but diagrammatically illustrating a hydraulic means for controlling the discharge means; and FIG. 5 is an exploded diagrammatic perspective view of a hydraulic differential which is part of the hydraulic means for controlling the discharge means.

As stated above, this invention relates to a spreader apparatus having an improved means for controlling discharge of material. In general, the spreader apparatus includes spreader means, hopper means, discharge means, and a hydraulic motor for driving the discharge means. The hydraulic motor is connected to a pump by means of a conduit and the pump supplies fluid to the motor. The present invention contemplates such a spreader apparatus including control means for maintaining a preselected ratio between the speed of the conveyor and the speed of the truck. In general the control means includes a first means responsive to the speed of the conveyor or discharge means, a second means responsive to the speed of the truck, and a third means responsive to the first and second means for maintaining said preselected ratio. The ratio may be maintained by adjustment of a flow control valve in the conduit or by other regulator means such as a variable displacement pump or a variable displacement conveyor drive motor. In this manner the speed of the conveyor is varied generally directly with the speed of the truck. This invention contemplates that the control means may be either mechanical, electrical, or hydraulic as hereinafter described. In addition, the spreader apparatus preferably includes a means for selectively varying or altering the preselected ratio and thereby altering the quantity of material spread correlative to the speed of the truck.

Like parts are indicated by like characters throughout this specification and the accompanying drawings.

Figure 3:
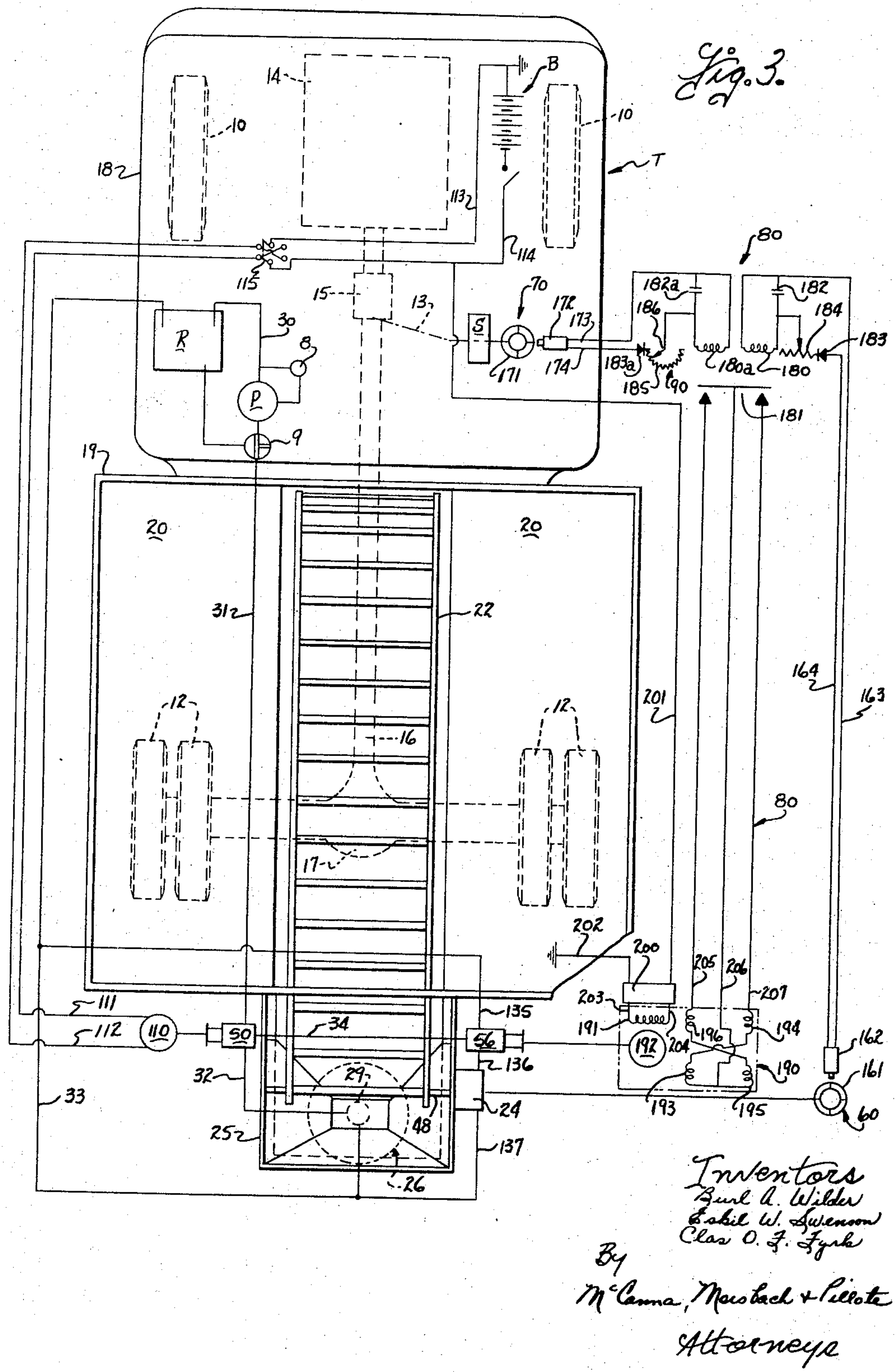
FIG. 3 is a top view of a truck having a hopper and a spreader mounted thereon and diagrammatically illustrating an electrical means for controlling the discharge means.

Referring now to the drawings, the vehicle or truck, designated generally by the letter T, is of conventional construction and includes front steering wheels 10 and rear drive wheels 12. As best shown in FIG. 3, a truck motor 14 is connected through a transmission 15, drive shaft 16, and differential 17 to the rear wheels 12 to propel the vehicle. A cab or operator's compartment 18 is provided adjacent the front end of the truck and hopper means such as material receiving box 19 is mounted at the rear end of the truck. The box or hopper 19 may be of any suitable type and, as illustrated herein, is of the V-box type. In general, the box illustrated has sides 20 sloping toward a centrally located discharge means which is conveniently in the form of a conveyor 22 located within the box 19 at the base of the V-shaped sides thereof. The conveyor 22 may be of any construction which will feed material at a rate correlative with the speed at which the conveyor is driven. In the embodiment illustrated, the conveyor is of the endless type; however, it is contemplated that other types of conveyors could be used for delivering material from the box 19, for example a screw type conveyor. The conveyor 22 is preferably driven by means of hydraulic motor 24 connected to shaft 48; said motor preferably being of the positive displacement type such as a gear, vane, internal gear or piston motor. The conveyor 22 is mounted to convey material longitudinally of the box 19; however, it is contemplated that the present invention is also adapted for use with different dump box and feed conveyor arrangements.

In the embodiment illustrated, the conveyor 22 feeds material to a chute 25 which directs the material to a spreader such as a spinner, designated generally by the numeral 26. The spinner illustrated is conveniently of the broadcast-type which throws the material fed thereto outwardly over an area correlative with the speed at which it is driven. Such broadcast spreaders are well known and in general include a disk or plate 27 mounted for rotation about a generally upright axis and a plurality of vanes 28 on the disk for engaging and throwing material outwardly as the disk is rotated. The spinner 26 is conveniently driven by a positive displacement type hydraulic motor 29, for example, of the gear, vane, internal gear or piston type and hereinafter sometimes called a spinner motor. The spinner is shown mounted centrally at the rear end of the truck T but it should be understood that it may be mounted at different locations on the vehicle and that different types of spreaders may be utilized.

It is sometimes desirable to spread liquid materials at a rate correlative with the speed of the vehicle, either alone or in conjunction with the spreading of particulate materials; for example, spreading asphalt and "chips" on a roadway. For such a purpose, a tank 319 for receiving the liquid material may be mounted on the vehicle in any desired manner (see FIG. 1). A discharge means, preferably in the form of a positive displacement type pump 322, is interposed in conduit or pipe 321 for pumping the liquid material from the tank to a spreader such as spray bar 326. The spray bar may be of any type and, as shown, has a plurality of openings or nozzles N for spreading the material. The positive displacement pump will feed material at a rate correlative with the speed at which it is driven. In the embodiment illustrated in FIG. 1, pump 322 is operatively connected to motor 24 through shafts 348 and 48a and a clutch and gear box C which may be manually operable. Preferably, the gear box includes a plurality of selectively engageable gears for varying the ratio of speed between shaft 348 and shaft 48a. In this manner, the ratio between particulate and liquid materials to be spread may be selectively altered. Similarly, the ratio may be varied between shaft 48a and conveyor shaft 48. The clutch is preferably arranged for engaging either shaft 348 or shaft 48 or both to be driven by motor 24. Thus, either material may be discharged independently of the other or both may be simultaneously discharged, if desired.

Figure 1:
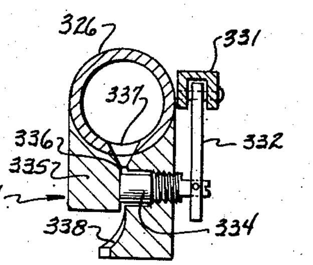
FIGURE 1 is a top view of a truck having hoppers for receiving materials to be spread and spreaders mounted thereon and containing a diagrammatic illustration of means for controlling the discharge means of the spreader apparatus.
Figure 1:
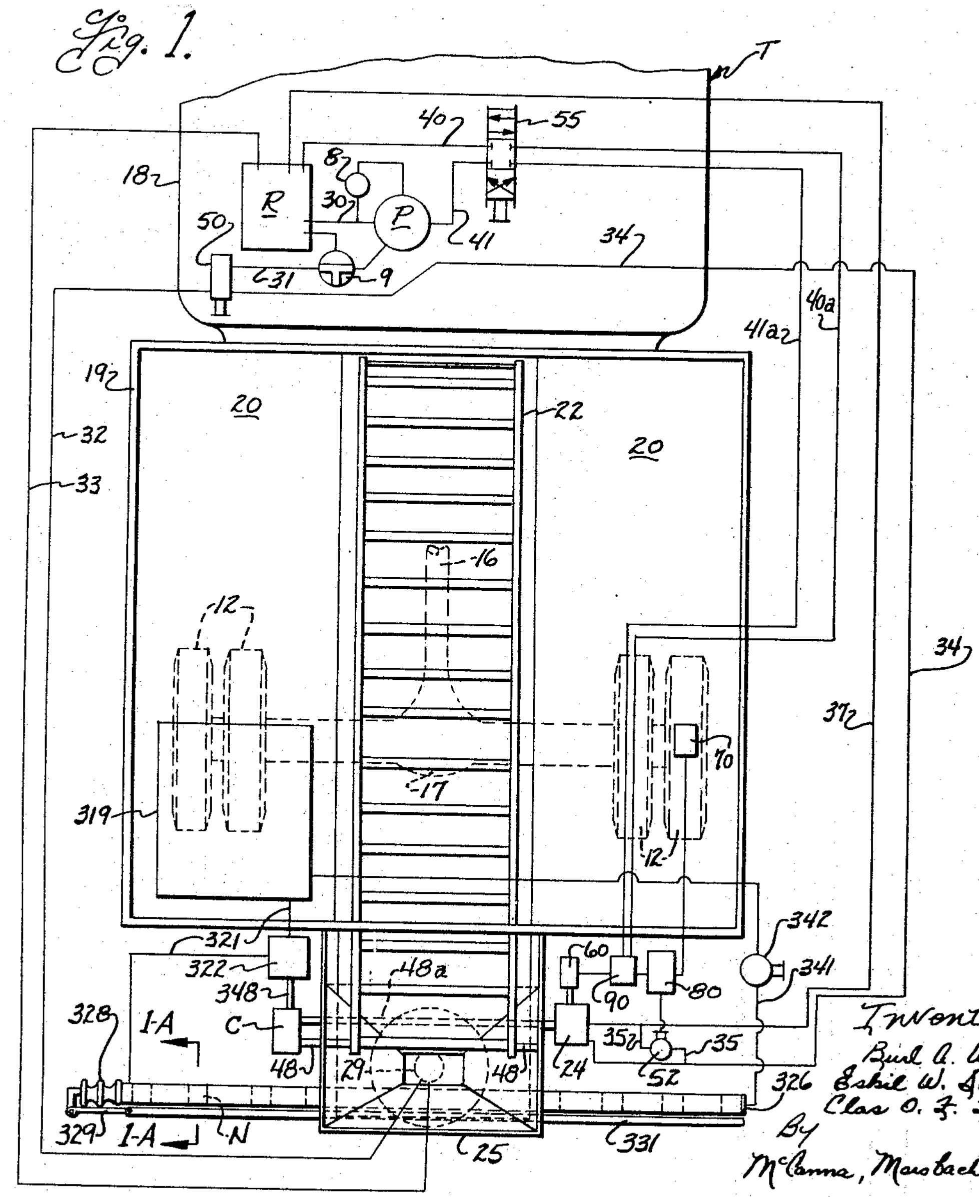

Preferably, the material is spread from the nozzles N in a uniform spray pattern over wide ranges of pump flows. The quantity of material is positively fed by pump 322 and the pump is driven at a speed correlative to the speed of the vehicle as hereinafter described. Accordingly, the volume of material discharged is correlative to the speed of the vehicle and will vary as the speed varies. If a nozzle having a fixed orifice is used, the velocity of the material discharged must vary as the quantity varies and this adversely affects the spray pattern. It is contemplated that various means may be utilized to provide a generally uniform spray pattern such as adjusting the size of the nozzle opening correlative to the pump speed. This may be accomplished, for example, by a pressure responsive regulator or a centrifugal governor driven correlative to the speed of the pump. An advantageous mechanism is illustrated in FIG. 1 where the opening in the nozzle is adjusted by a mechanism responsive to pressure in spray bar 326. The mechanism includes a pressure responsive bellows 328 which is connected through link 329 to elongate member 331. The elongate member is conveniently in the form of a channel (see FIG. 1A) which is pivotally connected to lever arm 332 which, in turn, is affixed to regulator 334. The nozzle N is attached to spray bar 326 and includes a depending body 335 which is communicated with the spray bar by means of opening 337. Adjacent the outlet of the throat is a deflecting surface 338 which aids in providing the spray pattern. Regulator 334 is rotatably mounted on body 335 and is operative to prevent flow through the throat in the position shown. As pressure in the spray bar increases, the bellows expands and transmits movement to channel 331. This movement operates to rotate the regulator and open nozzle N; there being a regulator and lever arm for each nozzle on the spray bar. Bellows 328 preferably has a built in resiliency or a spring (not shown) to normally urge the nozzles to closed position. In this manner, each nozzle is shut off when the pressure is zero and is opened correlative to pressure to maintain a substantially uniform spray pattern.

When bituminous materials are to be spread, tank 319 may have a means for heating the same (not shown) as is conventional to make the materials more fluid. Under such circumstances, it is desirable to have the spreader system heated prior to dispensing. To accomplish this, the present apparatus provides for selective circulation of the material through the system. A return pipe or conduit 341 connects the spray bar with the tank 319. A valve, such as manual valve 342, is interposed in pipe 341 for controlling flow therethrough. During spreading, this valve is closed; however, when opened the material will be recirculated to the tank. Ordinarily the nozzles will remain closed during such recirculation, but this may be assured by disconnecting the above described mechanism for adjusting the nozzles or providing a mechanical locking arrangement therefor (not shown).

Figure 2:
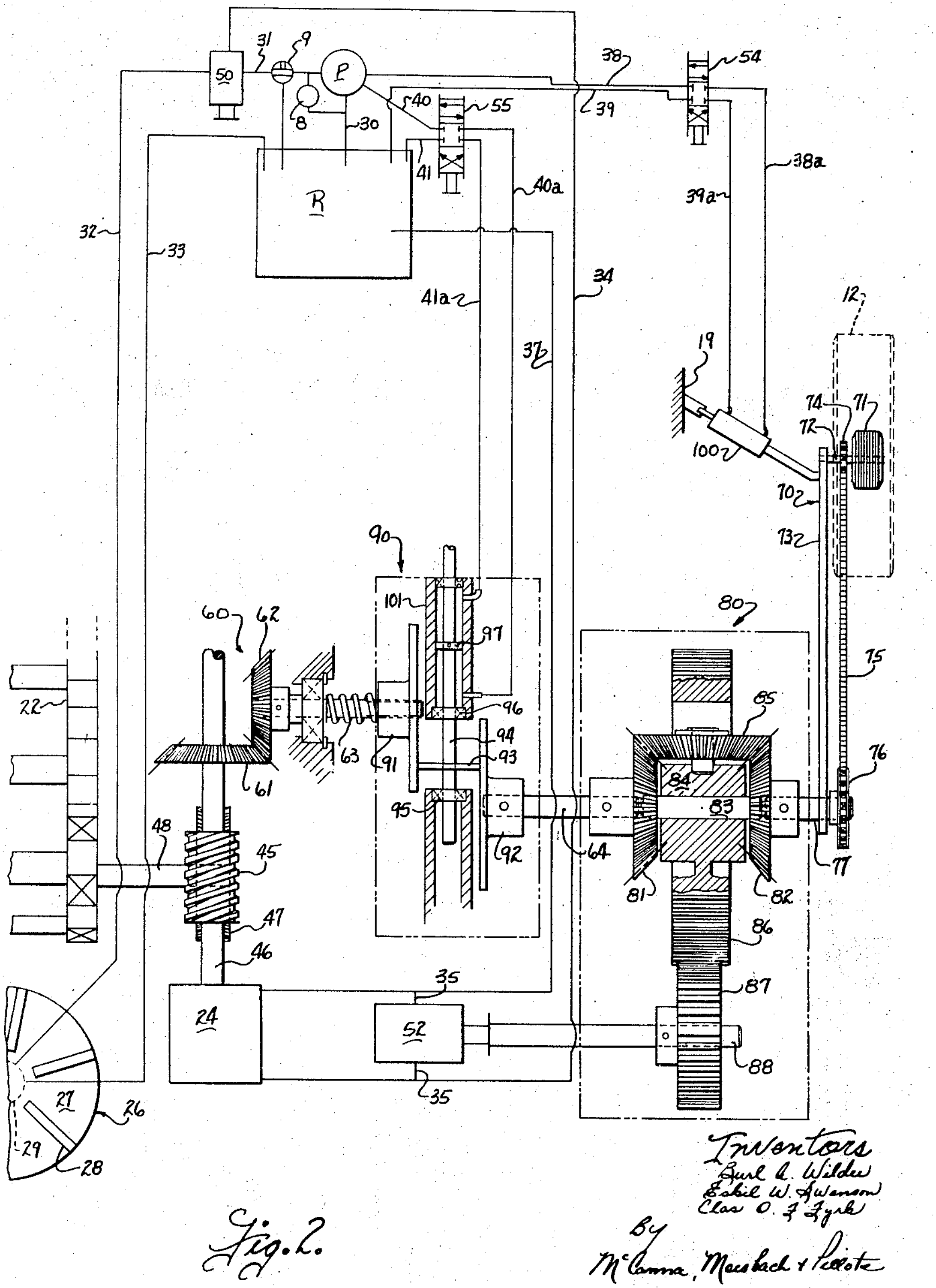
FIG. 2 is a view, in part detailed and in part schematic, of a spreader apparatus and mechanical means for controlling the discharge means and illustrating the mechanical means in detail.

Reference is now made more specifically to the hydraulic circuits, illustrated in FIGS. 1–4 of the drawings, for operating the hydraulic motor 24. The hydraulic circuit includes a pump mechanism P connected to a reservoir R by means of conduit 30. The pump mechanism P may be driven in any desired manner and may be conveniently driven from the truck engine 14. A suitable relief valve 8 is preferably provided to prevent damage to the apparatus in the event of excessive pump pressure or excessive loads on the hydraulic motor or motors. A three-way valve such as indicated at 9 is located in the cab 18 for manually starting and stopping flow through the hydraulic circuits. The spinner 26 is preferably driven by a hydraulic motor 29 and the pump P is arranged to deliver fluid to the motor 29 through conduits 31 and 32 and selector valve 50, as shown in FIGS. 1, 2 and 4. The The fluid is returned from the spinner motor 29 to the reservoir R through return conduit 33. The selector valve 50 may be of any convenient type to give the desired regulation of the spinner motor 29, and as herein illustrated is of the pressure-compensated flow-control type which has a by-pass outlet connected to a conduit 34 for by-passing a portion of the fluid. The pressure-compensated flow-control valve 50 has an adjustable orifice for controlling flow from the inlet to a flow controlled outlet and a pressure operated valve mechanism responsive to the pressure differential across the orifice to regulate flow through the by-pass outlet; thus maintaining a constant pressure drop across the orifice and hence a constant rate of flow determined by the orifice setting. In the embodiment illustrated in FIG. 1, valve 50 is conveniently located in the cab 18 for manual control of the orifice setting by the operator.

As illustrated in FIGS. 1, 2 and 4, the hydraulic motor 24 is conveniently connected to receive fluid from the by-pass 34 of the selector valve 50 as hereinafter described, it being understood that the hydraulic motor could be otherwise connected to receive fluid from the pump P or from a different pump. The pump P has a capacity substantially in excess of the requirements of the spinner motor and the excess fluid is by-passed through conduit 34 to motor 24 and the fluid is returned through return conduit 37 to the reservoir. A regulator means is provided for controlling the speed of motor 24 and, in the embodiments illustrated in FIGS. 1 and 2, said means is in the form of a valve 52 located in by-pass conduit 35 connected to conduits 34 and 37 to by-pass fluid around the hydraulic motor. With the above described arrangement, a single pump P can be used for driving both the spinner motor 29 and hydraulic motor 24.

From the foregoing it is deemed apparent that the pump P supplies fluid through a conduit to the hydraulic motor 24 which drives the discharge means. The hopper 19 may be filled with particulate material such as salt, sand, lime, chemicals and the like and this material will be discharged from the hopper at a rate correlative with the speed of the conveyor 22. The tank 319 may be filled with a material such as bituminous materials, or other liquid to be spread, and this material will be discharged at a rate correlative with the speed of pump 322. A regulator means is interposed for regulating the speed of motor 24 and thereby controlling the amount of material discharged.

Referring now to FIG. 1, there is diagrammatically illustrated control means for maintaining a preselected ratio between the speed of the conveyor 22, or discharge means, and the speed of the spreader apparatus relative to the surface being spread, or the speed of the truck T. The control means includes a first sensing means 60 responsive to the speed of the discharge means, a second sensing means 70 responsive to the speed of the truck T and third sensing means 80 responsive to said first and second sensing means for producing an output correlative with the difference in speeds detected by the first and second sensing means and for operating the regulator means to adjust the speed of the hydraulic motor 24 in a manner to maintain said preselected ratio between the speed of the discharge means and the speed of the truck. In this manner, the speed of motor 24 is adjusted to modify the speed of the discharge means 22 and 322 until the preselected ratio is achieved, thus maintaining the quantity of the material discharged generally in direct proportion to the speed of the vehicle. The combination preferably includes a selective means 90 for selectively altering or varying the preselected ratio and thereby altering the quantity of material spread relative to the speed of the truck.

Referring now to FIG. 2, a specific embodiment of a mechanical apparatus for controlling the speed of the discharge means is illustrated. The hydraulic motor 24 has its output shaft 46 operatively connected to drive shaft 48 through a speed reducer, herein shown in the form of a worm gear 45 and worm pinion 47. The first sensing means 60 for sensing the speed of the conveyor is conveniently connected to the shaft 46 of the conveyor drive motor for operation at a speed correlative with, but higher than, the speed of the drive shaft. As shown, the sensing means includes gears 61, 62 and shafts 63, 64 which impart rotary motion correlative with the conveyor speed to the third sensing means 80. For reasons pointed out hereinafter, the selector means 90 is advantageously interposed between the first or second sensing means 60 or 70 and the third sensing means 80 to selectively vary the ratio maintained between the speed of the conveyor and the speed of the truck. It is contemplated, however, that means other than the mechanical means described may be utilized for sensing the speed of the conveyor 22, and some examples, by way of illustration, are described infra.

The means for sensing the speed of the vehicle, generally designated by the numeral 70, includes a relatively small sensing wheel 71 frictionally engaged with wheel 12 of the vehicle. Sensing wheel 71 is mounted on an axle 72 attached to frame 73. Axle 72 is operatively connected to sprocket 74 which drives chain 75 thereby imparting motion to sprocket 76. The sprocket 76 is connected to a shaft 77 of the third sensing means 80 to impart rotary motion to that shaft correlative with the speed of the vehicle. In this manner the speed of the vehicle is sensed and this sensing is transmitted to the third sensing means or responsive means 80. It is contemplated that means other than the mechanical means described may be utilized for sensing the speed of the vehicle and some examples will be described infra. Provision is advantageously made for disconnecting the second sensing means when the device is not in use for spreading and, as shown, the mechanical means for sensing the speed of the vehicle is connected and disconnected by a hydraulic cylinder 100 which conveniently includes a piston and piston rod (not shown) and is mounted on a hopper 19. It is to be understood that other means of engaging and disengaging the sensing means may be utilized; as illustrated, however, the hydraulic cylinder 100 is attached to frame 73 to raise and lower the sensing wheel 71 out of and into engagement with the truck wheel 12. The hydraulic piston is operated by pump P which delivers fluid through conduits 38, 38*a*, 39 and 39*a*. The aforementioned conduits conveniently connect to a three-position four-way valve 54 which controls the raising and lowering of the hydraulic cylinder 100. As diagrammatically shown, the valve 54 is regulated by manual controls so that, in one position, the valve allows flow to hydraulic cylinder 100 so that it raises the frame 73 to an inoperable position; in another position the flow is reversed so that the frame is lowered to an operable position whereby the sensing wheel 71 engages truck wheel 12. In this embodiment, the valve 54 is conveniently located in the cab 18 to allow convenient engaging and disengaging of the sensing means while the truck is underway.

As described supra, the speed of the conveyor is sensed and imparted to third sensing means 80, as is the speed of the vehicle. As shown, the third sensing means is a planetary or differential gear mechanism in which one input shaft 64 is rotated at a speed correlative to the speed of the conveyor 22 and the other input shaft 77 is rotated at a speed correlative to the speed of the truck T. Shaft 64 imparts its rotation to bevel gear 81 and shaft 77 imparts its rotation to bevel gear 82. Gears 81 and 82 are axially aligned with shaft 83. A body 84 is mounted on shaft 83 and carries a pinion gear 85 which meshes with gears 81 and 82 and is free to revolve about shaft 83. These components comprise the mechanical means designated as third sensing means 80. Gears 81 and 82 are operatively connected to the conveyor and the truck wheel, respectively, in such a manner that the gears will rotate in opposite directions when the conveyor 22 is discharging material from the hopper and the truck T is being driven in a forward direction. Since gears 81 and 82 rotate in opposite directions, if their speeds are equal pinion gear 85 will rotate at a stationary point and body 84 will not move. If, however, there is a difference in speed, pinion gear 85 and body 84 will revolve in a direction and at a speed corresponding to the difference in speed of the gears 81 and 82. The rotation of the body 84 is transmitted to gear 86 which is mounted on body 84 and generally surrounds the body and pinion gear 85. Gear 86 drives gear 87 mounted on the differential output shaft 88 which is connected to flow control valve 52. In this manner, whenever the speed of the truck and the speed of the conveyor, as applied to differential input shafts 64 and 77, vary from each other, flow control valve 52 will be adjusted in a direction to either increase or decrease the amount of fluid to motor 24. This regulation continues until the difference between the two speeds, as sensed by gears 81 and 82, is zero. Any variance is integrated so that, after the regulation is completed, the total amount of conveyor travel correlative to the length of ground covered is the same as if no variance ever occurred. It is deemed obvious that the motions imparted to gears 81 and 82 are only correlative to the speeds of the discharge means and truck T, respectively. Thus, the gear ratios in first sensing means 60 and the wheel and pulley ratio in second sensing means 70 will determine the preselected ratio between the speed of the vehicle T and the speed of the discharge means. It can be seen that varying any of the ratios in the selector means 60 and 70 can vary the preselected ratio; however, a preferred manner of achieving such variation is in the form of selective means 90, described below.

The combination preferably includes the previously mentioned selective means 90 for varying the preselected ratio between the speed of the conveyor 22 and the speed of the truck T. As shown, selective means 90 is in the form of a mechanical speed adjuster including disks 91 and 92. Shaft 63 is attached to disk 91 and shaft 64 is attached to disk 92. A friction wheel 93 is mounted on shaft 94 and engages disks 91 and 92. Shaft 94 is supported by bearings 95 and 96 and is slidable axially whereby the rotation of disk 91 will impart varying speeds to disk 92 as friction wheel 93 assumes different positions. Friction wheel 93 is conveniently selectively moved by piston 97 mounted on rod 94 and contained in hydraulic cylinder 101. Cylinder 101 is connected to pump P by means of conduits 40, **40*a*, 41 and 41*a* which pass through a three-position, four-way valve 55 or manipulating means. The operation of valve 55 is similar to valve 54 described supra and is likewise located in the cab 18 for convenient variation of the preselected ratio while the truck is in motion. It is to be understood that the selective means 90 may be interposed between sensing means 70 and third sensing means 80 instead of first sensing means 60 and third sensing means 80** as illustrated. It is also to be understood that the foregoing is by way of illustration and that various substitutions obvious to those skilled in the art may be made without departing from the spirit of the illustration.

Referring now to FIG. 3, there is illustrated a particularly advantageous spreader apparatus having electro-responsive means for controlling the discharge means. As described supra, the spinner motor 29 is connected to reservoir R through a hydraulic circuit including pump P, and conduits 30–33. The speed of the spinner motor 29 is regulated by flow control valve 50. Unlike the circuits described above, however, the fluid passed by valve 50 is fed through conduit 34 to flow control valve 56, which is herein illustrated as a pressure-compensated flow-control type similar to valve 50. The flow control valve is connected to conduit 136 which leads to motor 24 and operates as a regulator means for the motor. Fluid from motor 24 flows into conduit 137 conveniently connected to return conduit 33. Flow control valve 56 operates to by-pass a portion of fluid through by-pass conduit 135 also connected to return conduit 33. This particular arrangement is described in detail in Patent No. 3,133,784 issued to E. W. Swenson et al. and further description herein is deemed unnecessary. In the aforementioned Swenson patent, however, the flow control valves were advantageously located in the cab 18. In the present arrangement, the flow control valves are preferably located in an area adjacent the motors they are to operate, e.g. the rear of the truck, and controlled by means other than the manual means revealed in the aforementioned Swenson patent. As herein illustrated, flow control valve 50 is operated by a reversing motor 110 also located at the rear of the truck, and which may be of any convenient type. Reversing motor 110 is conveniently a DC motor connected to battery B by means of wires 111–114. Connected in this circuit is a reversing switch 115 which operates to change the direction of the current, thus reversing the motor as selectively desired. Reversing switch 115 is conveniently located in the cab 18 for ease in manipulation by the operator of the vehicle T.

Flow control valve 56 is operated by electric motor means shown as reversing motor 190 which is a portion of third sensing means 80 of the present illustration. The reversing motor 190 may be of any convenient type and is herein illustrated as an AC shaded-pole motor which is a single-phase induction motor with a conventional squirrel-cage rotor 192. Such a motor is relatively simple, dependable, and inexpensive because it has no brushes, commutator, or moving switch parts. Short-circuited windings 193–196 surround a portion of each pole face. These windings, commonly called shading coils, cause the flux in that portion of the pole to lag behind the flux in the rest of the pole. The alternating magnetic field, produced by energizing the main motor winding 191, induces a current in the short-circuited shading coil; this current in turn sets up a magnetic field which lags the main flux and produces a rotating field to start and drive the motor. In the reversing motor diagrammatically illustrated, two multi-turn coils are used on each pole face. Direction of rotation is controlled by short circuiting either one pair or the other, located diagonally opposite each other. Main motor winding 191 is connected to an inverter 200 by means of wires 203 and 204. The inverter receives current from battery B through wire 201 and is grounded by wire 202. The inverter 200 produces AC current from the DC current received and thus serves as a power pack for the AC motor 190. The shading coils 193–196 are connected to a single-pole double-throw switch 181 by means of wires 205–207. The reversing of the motor is achieved by shorting through the single-pole double throw switch in a manner to be described infra. Since such motors are generally well known, further description is deemed unnecessary.

It will be recalled that first sensing means 60 is responsive to the speed of the discharge means 22 and that second sensing means 70 is responsive to the speed of the truck T. In the embodiment of the present example, second sensing means 70 is preferably in the form of a generator means including a serrated disk or rotor 171 of ferro-magnetic material connected to the drive for the speedometer S in the cab 18. The speedometer senses the speed of the truck through a speedometer cable 13 of the type furnished as standard equipment on trucks. The speedometer cable 13 may be connected in various manners to sense the speed of the truck and is herein illustrated as attached at the outlet end of the transmission 15. It is deemed obvious that serrated disk or rotor 171 will be driven at a rate proportional to the speed of the truck T. Included in the generator means and adjacent to the serrated disk is a magnetic pickup 172 including a pole piece and winding attached to wires 173 and 174. The serrated disk and the magnetic pickup will produce a voltage signal in wires 173 and 174 which is correlative to the speed of the truck. It is to be understood that the second sensing means 70 could be connected to an axle or other member of the truck which has motion correlative to the speed of the truck; however, the above described embodiment is the preferred form.

First sensing means 60, in the present example, is preferably a generator means similar to the second sensing means 70. A serrated disk 161 of ferro-magnetic material is attached to motor 24 to rotate therewith. It is to be understood that the first sensing means may be connected to conveyor shaft 48 or otherwise arranged to rotate at a speed correlative to the speed of the conveyor 22 or discharge means. A magnetic pickup device 162 is closely adjacent to the serrated disk 161 and produces a voltage signal in wires 163 and 164.

The two above mentioned voltage signals are transmitted to respective relay coils 180 and **180*a* through rectifiers 183 and 183*a* to change the AC voltage signal to a DC signal and smoothing capacitors 182 and 182*a* are provided in parallel with the respective relay coils. Provision is made for balancing the input voltage signals applied to the relay coils from the different sensing means when the speed of the truck and the speed of the conveyor are in the desired preselected ratio. An adjustable resistor 184 is conveniently provided in one of the circuits to balance the two voltage signals and thus obtain the aforementioned preselected ratio which will provide the desired basic discharge rate. A second adjustable resistor 185 has manipulating means or controls 186 conveniently located in the cab or operator's compartment 18 for manipulation by the operator for varying the aforementioned preselected ratio. In this manner, the second adjustable resistor serves as a selective means 90 for selectively altering the preselected ratio between the speed of the truck and the speed of the conveyor. It should be undrstood that the balancing resistor 184 is located in the circuit with the generator means that produces the higher voltage when they are operated at the preselected speeds so as to reduce that voltage and "balance" the voltage from th other sensing means. The second adjustable resistor 185 comprising the selective means 90 may be located in either circuit as is convenient. With the exception of the second adjustable resistor 185, the relay coils and the attached components, together with the single pole double-throw switch 181, and reversible motor 190 make up the third sensing means 80 which is responsive to the first sensing means and the second sensing means and operative to adjust flow control valve 56 when said speeds vary from the preselected ratio thereby modifying the speed of motor 24** until the preselected ratio is again achieved.

Referring now to FIG. 4, there is illustrated a spreader apparatus having hydraulic control means for controlling the discharge means. As in the other examples described above, the control means comprises a first sensing means 60 responsive to the speed of the conveyor 22, a second sensing means 70 responsive to the speed of the truck T, and a responsive means or third sensing means 80 responsive to the first and second sensing means. In the embodiment illustrated, the second sensing means 70 may, for example, be similar to the apparatus shown in FIG. 2 and described in detail above and further description is deemed unnecessary. First sensing means 60 is in the form of a fluid metering device 65 herein diagrammatically illustrated as a positive displacement gear-type pump for measuring the flow of fluid through conduit **37*a*. Since the conveyor 22 is driven by hydraulic motor 24, the flow of fluid through the motor is approximately proportional to the speed of the conveyor. Thus, by sensing or measuring the flow of fluid through conduit 37*a*, there is obtained a motion relative to the speed of the conveyor. This motion is transmitted to third sensing means 80 through shaft 68. The motion of second sensing means 70 is transmitted to third sensing means through shaft 78. Third sensing means 80 is responsive to said first and second sensing means and, in this embodiment, is operative to regulate the flow of fluid to the conveyor motor 24**.

An embodiment of third sensing means 80 is diagrammatically illustrated in FIG. 5. This embodiment consists of four substantially circular plates 281–284. In operative position, these plates are sandwiched together and enclosed in a housing 285 as shown in FIG. 4. Plates 281 and 284 are restrained against rotation by being affixed to housing 285 in any convenient manner; while plates 282 and 283 are arranged for rotation therein. Plate 282 is mounted on shaft 78 which extends through a bore in plate 281. Similarly, plate 283 is mounted on shaft 68 which extends through a bore in plate 284. It should now be obvious that rotation of first sensing means 60 will cause shaft 68 to rotate and this rotation is tranmitted to plate 283. Similarly, movement of second sensing means 70 will cause shaft 78 to rotate and this rotation is transmitted to plate 283. Extending through plate 281 there are two ports **286*a*, 287*a* which are connected to pressure conduit 34 and return conduit 37, respectively. Ports 286*a* and 287*a* are preferably on different radii from the center of plate 281 for respective communication with concentric collector rings 288 and 289 in the adjacent face of plate 282. Extending through plate 282 are ports 286*b* and 287*b* which communicate with rings 288 and 289, respectively. Port 287*b* continuously communicates with conveniently pear-shaped collector groove 290 in the adjacent face of plate 283. Port 286*b*, depending on position, can communicate with collector groove 290 or split ring collector ing 291 in the adjacent face of plate 283, or both. In an inoperative or neutral position, when the truck T is not moving or when the second sensing means 70 is disengaged as described above in conjunction with FIG. 2, shaft 78 will not rotate. Under this condition as illustrated in FIG. 5, the fluid flowing through the conduit 34 will flow through port 286*a*, ring 288, and port 286*b* and into collector groove 290. The fluid is then returned through port 287*b*, ring 289, and port 287*a* into return conduit 37. Thus, when shaft 78 is not rotated, no fluid is passed through the third sensing means 80 to the motor 24 and there is no motion of shaft 68. This is the inoperative position. As soon as shaft 78 is rotated correlative to the speed of truck T, port 286*b* will communicate with split collector ring 291. The fluid is then communicated through port 286*c* which extends through plate 283, and into collector ring 292 in the adjacent face of plate 284. Extending through plate 284, and communicating with collector ring 292 is port 286*d* attached to pressure conduit 34*a* which leads to conveyor motor 24. Return conduit 37*a* returns fluid from conveyor motor 24 through metering device 65 to port 287*d* in plate 284. The fluid is then passed through collector ring 293 in plate 284 and port 287*c* in plate 283 into the afore-described collector groove 290. In the manner described above, the fluid is returned from collector groove to return conduit 37 and back to reservoir R. In this manner, third sensing means 80 senses the relative motion of first sensing means 60 and second sensing means 70 and also operates to regulate the flow of fluid to motor 24** to maintain the preselected ratio of their speeds.

The ratio of the speed of truck T and the discharge means may be varied by selective means 90. In the embodiment illustrated in FIG. 4, the selective means 90 is conveniently in the form of a proportional flow divider 290 connected to conduits **34*a* and 37*a* by conduit 42. The proportional flow divider 290 preferably has manipulating means for controls 98 located in cab 18 and connected to the proportional flow divider by an apparatus 99. The controls 98 and apparatus 99 may be in the form of a reversing motor and the switch and wires providing a circuit thereto, similar to reversing motor 110 illustrated in FIG. 3 and described in detail above. It is contemplated that other forms of remotely operated controls may be utilized. Since the proportional flow dividers are readily available on the market, a detailed description is deemed unnecessary. It should be pointed out, however, that in this example, the selective means 90 is interposed before the first sensing means 60 rather than between first sensing means and third sensing means 80. Thus, the variation of the preselected ratio is operative because it feeds false information to first sensing means 60** rather than altering the impulse between the first sensing means and third sensing means.

While we have thus described several specific embodiments of our invention, it has been done by way of illustration and is not intended to be exhaustive. For example, it is contemplated that various portions of the several forms may be interchanged to provide workable systems within the spirit of the present invention. Thus, the foregoing examples should not be construed by way of limitation and we do not wish to be limited except as required by the appended claims.

We claim:

1. In a spreader apparatus for use on a vehicle the combination of:

hopper means on the vehicle for receiving material to be spread;

discharge means for discharging material from the hopper means at a rate correlative with the speed of the discharge means;

hydraulic motor means for driving the discharge means;

conduit means connected to the hydraulic motor means;

pump means connected to the conduit means to supply fluid under pressure thereto;

engine means for driving said pump means;

regulator means having an operator adjustable to different positions to increase and decrease the flow of fluid to said hydraulic motor means for regulating the speed of the hydraulic motor means and thereby controlling the amount of material discharged by the discharge means; and control means for maintaining a preselected ratio between the speed of the discharge means and the speed of the spreader apparatus relative to the surface being spread and including:

a first sensing means responsive to the speed of the discharge means and a second sensing means responsive to the speed of the spreader apparatus relative to the surface being spread, and a third sensing means responsive to said first and second sensing means for adjusting said operator to respectively increase or decrease the flow of fluid to said hydraulic motor means automatically according to whether the ratio of said speeds is below or above said preselected ratio to modify the speed of the hydraulic motor means which drives the discharge means until the preselected ratio is achieved whereby the quantity of material discharged by the discharge means is maintained substantially correlative to said relative speed and a generally uniform quantity of material is spread on the surface.

2. The combination of claim 1 and including selective means for selectively altering the preselected ratio to be maintained by said control means between the speed of the discharge means and the speed of the spreader apparatus relative to the surface being spread thereby selectively altering the quantity of material spread on the surface in a substantially uniform manner.

3. The combination of claim 1 wherein said regulator means includes a by-pass conduit means for by-passing a portion of the fluid from the pump means to a reservoir and a valve means in the by-pass conduit means for adjustably regulating the rate of flow of fluid through the by-pass conduit and thereby regulating the rate of flow of fluid through the conduit means to control the speed of the hydraulic motor means.

4. The combination of claim 1 wherein said regulator means includes a flow control valve in said conduit means for adjustably regulating the rate of flow of fluid therethrough to control the speed of the hydraulic motor means.

5. In combination with a vehicle having a means for propelling the same, hopper means on the vehicle for receiving material to be spread, discharge means for discharging material from the hopper means at a rate correlative with the speed of said discharge means, hydraulic motor means for driving the discharge means, conduit means connected to the hydraulic motor means, pump means connected to the conduit means to supply fluid under pressure thereto, engine means for driving said pump means, means in the conduit means including valve means for regulating the rate of flow of fluid through the conduit means to control the speed of the hydraulic motor means and thereby control the amount of material discharged by the discharge means, and control means for maintaining a preselected ratio between the speed of the discharge means and the speed of the vehicle, said control means including a first sensing means responsive to the speed of the discharge means for producing a first electrical signal correlative with the speed of the discharge means and a second sensing means responsive to the speed of the vehicle for producing a second electrical signal correlative with the speed of the vehicle, and valve control means responsive to said first and second electrical signals for adjusting said valve means to respectively increase or decrease the flow of fluid to said hydraulic motor means automatically according to whether the ratio of said speeds is below or above said preselected ratio to modify the speed of said hydraulic motor which drives the discharge means until said preselected ratio is achieved thereby maintaining the quantity of material discharged by the discharge means substantially correlative to the vehicle speed and spreading a generally uniform quantity of material.

6. In combination with a vehicle, means for propelling the vehicle, hopper means on the vehicle for receiving material to be spread, discharge means for discharging material from the hopper means at a rate correlative with the speed of the discharge means, hydraulic motor means for driving the discharge means, conduit means connected to the hydraulic motor means, pump means connected to the conduit means to supply fluid under pressure thereto, regulator means for regulating the speed of the hydraulic motor means and thereby controlling the amount of material discharged by said discharge means, a first means responsive to the speed of the discharge means, a second means responsive to the speed of the vehicle, and third sensing means responsive to said first and second means for maintaining a preselected ratio between the speed of the discharge means and the speed of the vehicle by adjusting the regulator means when said speeds vary from the preselected ratio to modify the speed of the hydraulic motor means which drives the discharge means until the preselected ratio is achieved whereby the quantity of material discharged by said discharge means is maintained substantially correlative to the speed of the vehicle and a generally uniform quantity of material is spread.

7. The combination of claim 6 wherein said first sensing means includes a fluid metering device in said conduit means to meter the flow of fluid through said hydraulic motor means and whereby said metering device is rotated at a speed correlative to the speed of said discharge means.

8. The combination of claim 6 wherein said first sensing means includes a first generator means operatively connected to said discharge means for producing a first voltage signal correlative to the speed of said discharge means, said second sensing means includes a second generator means operatively connected to the vehicle for producing a second voltage signal correlative to the speed of the vehicle, and said third sensing means includes an electro-responsive means and an electric motor means, said electro-responsive means responsive to said first and second voltage for producing an output signal correlative with the difference between said first and second voltage for reversibly operating the electric motor means to adjust the regulator means.

9. The combination of claim 8 wherein said second generator means is operatively connected to the speedometer shaft of the vehicle for producing a second voltage signal correlative to the speed of the vehicle.

10. The combination of claim 6 wherein said first sensing means includes a first mechanical means driven at a speed correlative to the speed of said discharge means, said second sensing means includes a second mechanical means driven at a speed correlative to the speed of the vehicle, and said third sensing means includes a differential gear mechanism responsive to said first and second mechanical means for adjusting the regulator means.

11. The combination of claim 6 and including selective means for selectively altering the ratio maintained by said third sensing means between the speed of the discharge means and the speed of the vehicle thereby selectively altering the quantity of material spread correlative to the speed of the vehicle.

12. The combination of claim 11 wherein said first sensing means includes a fluid metering device in said conduit means to meter the flow of fluid therethrough and said selective means includes an hydraulic flow divider to divide the flow of fluid to the hydraulic motor means.

13. The combination of claim 11 wherein said first sensing means includes a first generator means operatively connected to the discharge means for producing a first voltage signal correlative to the speed of said discharge means, said second sensing means includes a second generator means operatively connected to the vehicle for producing a second voltage signal correlative to the speed of said vehicle, said third sensing means includes an electro-responsive means and an electric motor means, said electro-responsive means responsive to said first and second voltage for producing an output signal with the difference between said first and second voltage for reversibly operating the electric motor means to adjust the regulator means, and said selective means includes an adjustable resistor for selectively altering the ratio of said first and second voltage to said electro-responsive means.

14. The combination of claim 11 wherein said first sensing means includes a first mechanical means driven at a speed correlative to the speed of said discharge means, said second sensing means includes a second mechanical means driven at a speed correlative to the speed of the vehicle, said third sensing means includes a differential gear mechanism responsive to said first and second mechanical means for adjusting the regulator means, and said selective means includes a mechanical speed adjuster located between said third sensing means and one of the group consisting of said first sensing means and said second sensing means for selectively altering the ratio between the speed of the discharge means and the speed of the vehicle.

15. The combination of claim 11 wherein said selective means includes manipulating means for altering the ratio between the speed of the discharge means and the speed of the vehicle while the vehicle is in motion, said manipulating means being located in an operator's compartment of the vehicle and so constructed and arranged that an operator in the compartment may selectively alter said ratio while the vehicle is in motion.

16. The combination of claim 1 wherein the hopper means includes a box for receiving particulate material to be spread, and the discharge means includes a conveyor for discharging the particulate material from the box at a rate correlative with the speed of the conveyor.

17. The combination of claim 1 wherein the hopper means includes a tank for receiving liquid material to be spread, and the discharge means includes a positive displacement pump for discharging the liquid material from the tank at a rate correlative with the speed of the pump.

18. The combination of claim 1 wherein the hopper means includes a box for receiving particulate material to be spread and a tank for receiving liquid material to be spread, and the discharge means includes a conveyor for discharging the particulate material from the box at a rate correlative with the speed of the conveyor and a positive displacement pump for discharging the liquid material from the tank at a rate correlative with the speed of the pump.

19. The combination of claim 1 including spreader means for spreading the material discharged by the discharge means.

20. The combination of claim 19 wherein the hopper means includes a tank for receiving liquid material to be spread, the discharge means includes a positive displacement pump for discharging the liquid material from the tank at a rate correlative with the speed of the pump, and the spreader means includes a spray bar having adjustable nozzle means thereon for maintaining a generally uniform spray pattern over a relatively wide range of pump flows.

21. The combination of claim 20 wherein the spray bar includes pressure operated means operatively connected to the nozzle means for adjusting the nozzle opening in response to fluid pressure in the spray bar to maintain a generally uniform flow velocity through the nozzle means.

22. The combination of claim 19 wherein the hopper means includes a box for receiving particulate material to be spread and a tank for receiving liquid material to be spread, the discharge means includes a conveyor for discharging the particulate material from the box at a rate correlative with the speed of the conveyor and a positive displacement pump for discharging the liquid material from the tank at a rate correlative with the speed of the pump, and the spreader means includes a spinner for spreading the particulate material and a spray bar for spreading the liquid material.

23. The combination of claim 1 wherein the regulator means includes an adjustable pressure-compensated flow-control valve in the conduit means for regulating flow from the pump means to the hydraulic motor means to control the speed thereof, and wherein the last-mentioned means is operative to adjust the pressure-compensated flow-control valve when said speeds vary.

References Cited

UNITED STATES PATENTS

| | | | |
|---|---|---|---|
| 1,613,051 | 1/1927 | Napier | 94—44 |
| 2,149,660 | 3/1939 | Blood | 239—533 X |
| 2,159,319 | 5/1939 | Cartwright | 239—156 X |
| 2,475,219 | 7/1949 | Cartwright | 239—155 X |
| 2,959,356 | 11/1960 | Shaffer | 239—150 X |
| 3,019,025 | 1/1962 | Young | 275—15 X |
| 3,113,784 | 12/1963 | Swenson et al. | 275—8 |
| 3,167,915 | 2/1965 | Phillips | 275—8 X |
| 3,199,423 | 8/1965 | Dickey | 239—159 X |

ABRAHAM G. STONE, *Primary Examiner.*

J. R. OAKS, *Assistant Examiner.*